United States Patent Office 3,002,728
Patented Oct. 3, 1961

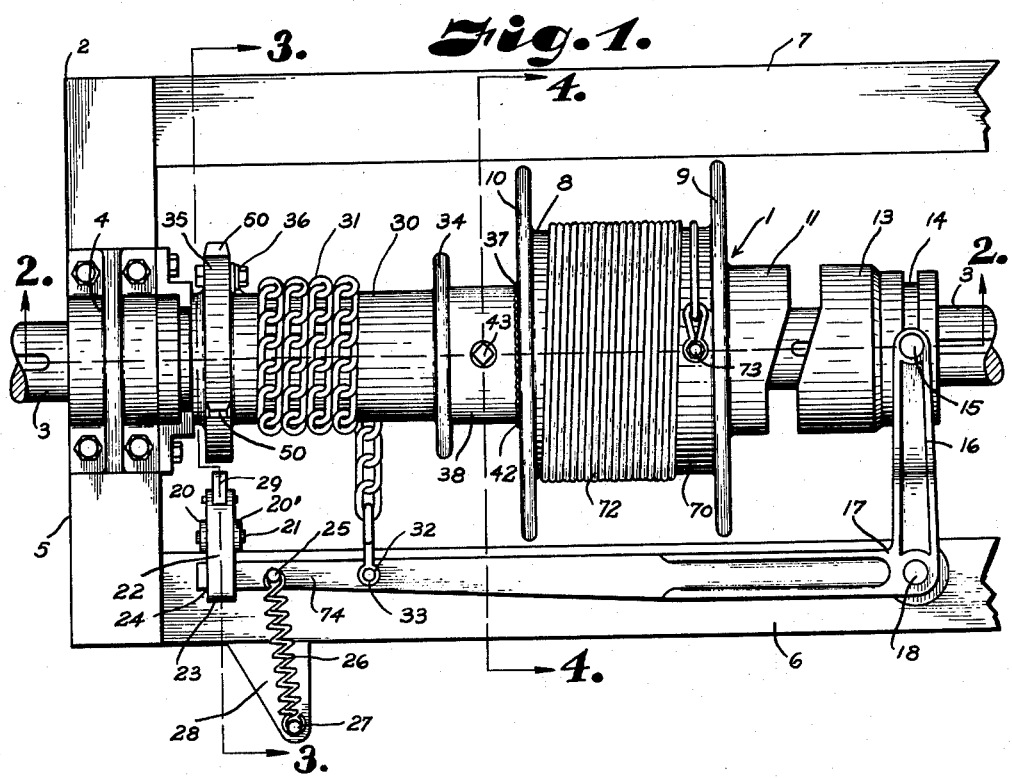

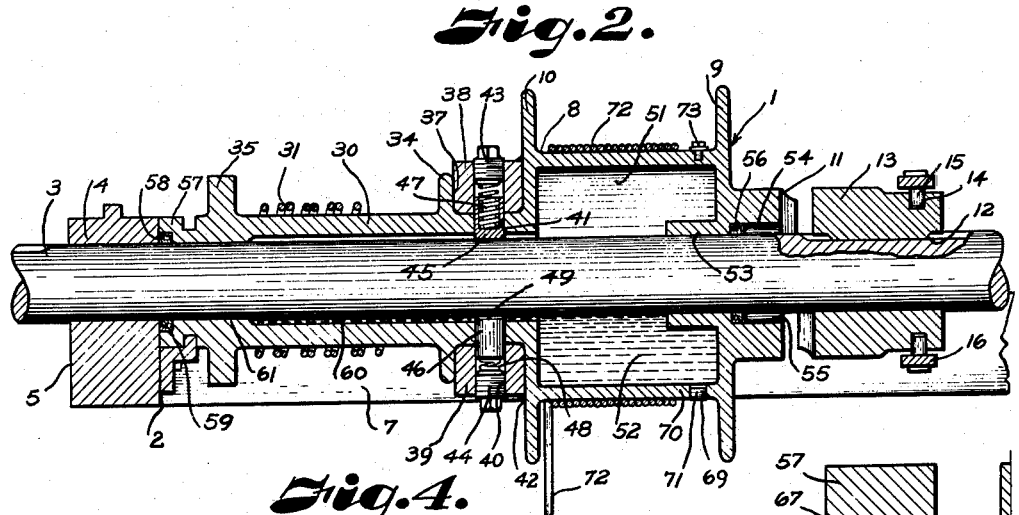
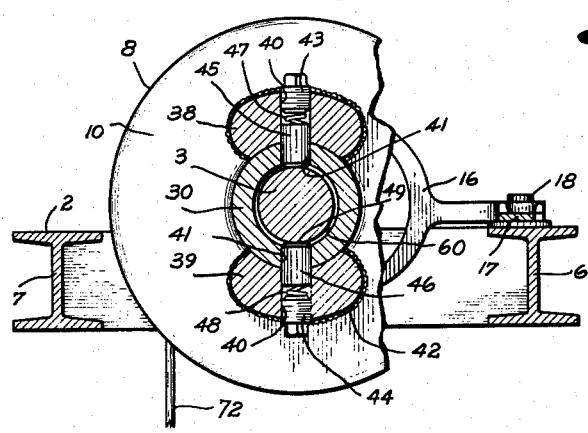
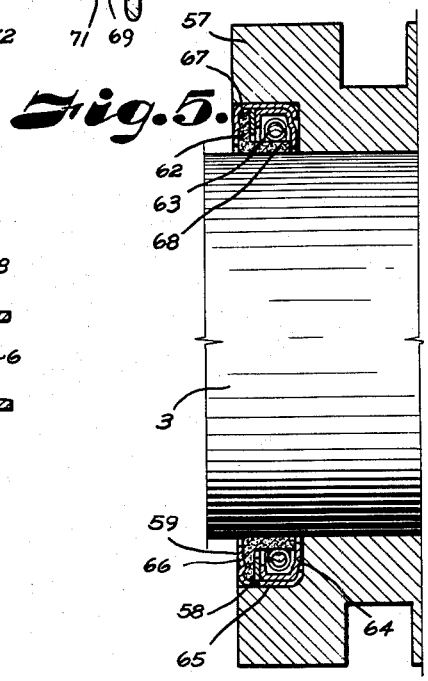
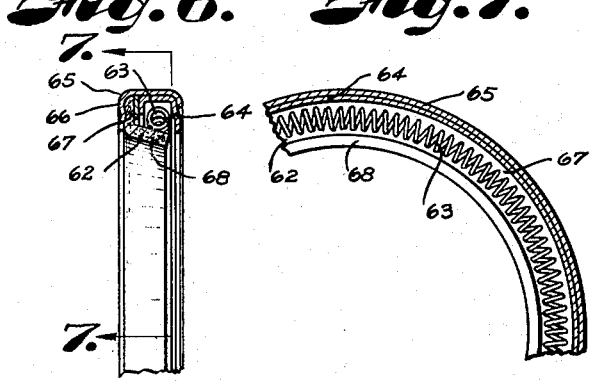

3,002,728
OILING APPARATUS FOR MECHANISM
FOR UNLOADING CARS
Roy L. Brooks, 4429 Harrison, Kansas City, Mo.
Filed Aug. 13, 1958, Ser. No. 754,770
1 Claim. (Cl. 254—187)

This invention relates to apparatus for unloading grain or other bulk material from freight cars and more particularly to a novel lubricating and sealing apparatus for a tripping mechanism for a car unloading device.

With apparatus heretofore used, such as power shovels for unloading bulk material from cars, weighted ropes to trip the mechanism on the shovel machines have been used but the use of such weighted ropes to trip the mechanism on the shovel machines has been unsatisfactory because the action is slow and necessitates the pulling of excess cable slack by the operator. Further objection to apparatus heretofore used has been the dust and dirt problem wherein the shaft used in the mechanism would require frequent oiling and due to the forgetfulness of the operator the shaft would become worn because of improper lubrication. Another objection to the devices in use is the slack in the cable becoming a hazard to the operators and the equipment because it requires constant replacement of twisted link chains, weight ropes and cable.

With previously used weight ropes for tripping the mechanism on the shovel machines, the action was slow and required the pulling of excess cable slack by the operator even though he may be shoveling in the doorway of the car. The slack cable becomes a hazard to men and equipment. To overcome these disadvantages the present invention provides the means whereby the weight ropes are eliminated so that the rope is removed and replaced by two blocks which may be made of cast iron and these blocks rotate with the drum and are arranged in engagement therewith plugs or plungers which are adapted to engage the rotating shaft.

It is the principal object of the present invention to provide an oil bath whereby the oil may be distributed over the area of the shaft rotating in the mechanism to prevent wear thereon and to provide for sealing of the oil around the shaft to eliminate frequent oiling thereof.

Other objects of the present invention are to provide apparatus which eliminates the use of the rope and weight system of operating the tripping mechanism of the shovel machines; to provide tripping mechanism adjustable to the exact pull desired; to provide apparatus whereby the chains or cables are quickly and easily replaced and to provide apparatus of this character which is simple, economical to manufacture and easy to install.

In accomplishing these and other objects of the invention, we have provided improved details of structure, the preferred forms of which are illustrated in the accompanying drawings; wherein:

FIG. 1 is a top elevational view of the power shovel constructed according to the present invention.

FIG. 2 is a sectional view taken on a line 2—2, FIG. 1.

FIG. 3 is a sectional view taken on a line 3—3, FIG. 1.

FIG. 4 is a sectional view taken on a line 4—4, FIG. 1.

FIG. 5 is a cross sectional view particularly illustrating the sealing mechanism in sealing engagement with the drive shaft.

FIG. 6 is a fragmentary enlarged cross sectional view particularly illustrating the sealing mechanism shown in a disengaged position.

FIG. 7 is an enlarged fragmentary cross sectional view illustrating the springs in the sealing mechanism, taken on a line 7—7, FIG. 6.

Referring more in detail to the drawings:

1 designates a part of my power shovel unloading mechanism comprising a frame 2 for supporting a shaft 3 through bearings 4 mounted on one end 5 of the frame and bearings (not shown) on the other end of the frame. The shaft is connected to a suitable power source such as a motor (not shown). The frame includes I-beams 6 and 7 supported on the structure for mounting of the mechanism thereon, the shaft 3 being supported in the bearings projecting upwardly from from the horizontally disposed framework structure.

Loosely mounted on the shaft 3 is a drum or spool 8 having integrally formed side walls 9 and 10. Extending from one side of the drum 8 is a first clutch member 11. Slidably mounted on the shaft 3 and keyed thereto as indicated at 12 (FIG. 2) is a second clutch member 13 movable into and out of engagement with the clutch member 11. The clutch member 13 has a reduced end provided with an annular groove 14 for receiving pins 15 for connecting a yoke 16 to the clutch member 13, the yoke 16 is integrally connected to a lever 17 and forms an L-shaped structure, the lever 17 being pivotally mounted as at 18. When the lever 17 is actuated the clutch member 13 can be moved into engagement with the clutch member 11 so as to cause the drum or spool 8 and shaft 3 to rotate in unison.

Brackets 20 are rigidly secured by welding or other suitable means to the web portion 19 of the I-beam 6 of the frame and the brackets have upstanding ears 20' to which is pivotally mounted as at 21 one end of a lever arm 22 provided with a depending shoulder or finger 23 for engaging against the side of the free end of the lever 17 as best illustrated at 24 (FIG. 3). Spaced from the free end of the lever 17 and secured thereto is a pin 25 to which one end of a coil spring 26 is engaged and the opposite end is engaged in a pin 27 secured to a bracket 28 which extends from the frame 6 as best illustrated in FIG. 3. The opposite or free end of the lever arm 22 has mounted thereon a latch or tongue 29 for a purpose later described.

Secured to the side wall 10 of the spool or drum 8 and formed integral therewith is a cylindrical sleeve 30 which surrounds a portion of the shaft 3. Adapted to be wound around the sleeve 30 is a chain 31 and one end of the chain is connected to the lever 17 as indicated at 32 (FIG. 1) by a bolt or screw 33. The sleeve 30 has an annular flange 34 spaced from the side wall 10 of the spool, and the outer end of the sleeve 30 is provided with an annular flange 35. The free end of the chain 31 is secured to the flange 35 by a bolt or the like 36 (FIG. 1), and the chain is trained within the space defined by the annular flanges 34 and 35.

Adapted to be mounted in the space 37 between the flange 34 and side wall 10 of the spool is a pair of blocks or body members 38 and 39, each having a threaded opening 40 registering with an opening 41 on opposite sides of the sleeve 30. The blocks 38 and 39 are secured to the side wall 10 of the spool by welding or other suitable means as indicated at 42. Threaded plugs 43 and 44 are provided for engagement in the threaded openings 40 of the blocks. To engage within the openings 40 and 41 in the blocks and sleeve respectively are plungers 45 and 46 having their inner ends engaging against the shaft 3 as best illustrated in FIG. 4. The plungers are urged against the shaft by coil springs or the like 47 and 48 mounted between the plugs 43 and 44 and the plungers 45 and 46. It will be noted the inner ends 49 of the plungers 45 and 46 are straight lined instead of concave to fit the contour of the shaft. Having the ends of the plungers of straight construction gives a line point contact of the plungers with the shaft providing better control of the shaft. Tension on the plungers is adjustable by adjusting the plugs 43 and 44 in the block.

The tripping mechanism for operating the lever 17 includes the annular flange 35 on the sleeve 30 and projecting outwardly from the flange 35 are a plurality of lugs 50 (FIG. 3) adapted to engage the projecting end of the latch 29 on the arm 22 and the arm includes the shoulder or finger 23 for engaging the lever 17 for operation thereof as will later be shown.

The spool or drum 8 is substantially greater in diameter than the shaft 3 providing a chamber 51 around the shaft for housing or containing a lubricant 52 for lubricating the shaft 3, with the said shaft in constant contact with the lubricant to cause a continuing lubrication to prevent wear and to provide for easy operation thereof. It will be understood that the apparatus is working in dusty conditions and if dirt is allowed to contact the shaft at the working parts thereof considerable wear will be encountered. The wall 9 of the drum has an inwardly extending annular flange or bearing portion 53. The clutch portion 11 secured to the wall 9 has a recess 54 providing a shoulder 55 and mounted in the recess to engage against the shoulder 55 is a sealing member 56. The outer end of the sleeve 30 outwardly of the flange 35 is provided with an annular flange 57 having a recess 58 in its outer edge adapted to receive a sealing member 59. The sleeve 30 is also recessed as indicated at 60 to provide a space around the shaft 3 which extends through the sleeve to allow for the lubricant 52 to move around the shaft as the shaft is rotated. The recess 60 extends over a substantial distance of the shaft to a bearing portion 61 in the sleeve 30 so that ample lubrication will be provided for the shaft 3 and bearing portion 61. The sealing members 56 and 59 will prevent loss of the fluid from the chamber 51 and the plugs 43 and 44 also prevent escape of fluid through the openings in the sleeve which accommodate for the plungers 45 and 46.

The sealing members 56 and 59 are illustrated in FIGS. 5, 6 and 7 and comprise a substantially angled or L-shaped ring member 62 of material such as felt, leather or the like and in order to urge the sealing ring against the shaft 3 there is provided a coil spring 63 which also extends around the shaft 3 and is enclosed in a substantially U-shaped metal member 64 which metal member is also encased within a larger metal casement 65 having one wall 66 engaging against the vertical portion 67 of the sealing member 62 and the leg 68 of the sealing member engaging against the shaft 3. The purpose of the spring is to urge the sealing members 56 and 59 against the shaft best illustrated in FIG. 5, thereby preventing loss of fluid from the chamber 51 after entering the bearing portions 53 and 61.

In operation of my device it is important that the pressure plugs 45 and 46 be lubricated at all times so that they will be operated smoothly.

The fluid is inserted into the chamber 51 through the opening 69 in the wall 70 of the spool 8 and said opening 69 in the spool 8 is in alignment with the opening 40 of the block 39 and in exactly the opposite side from the opening in the block 38. This is for the purpose of being able to remove the plug 43 and plunger 45 with its spring from the opening in the block 38 and inserting a flushing fluid in the chamber to drain the chamber of lubricant and wash the foreign matter from and around the shaft and relubricating the same through the opening 69. The opening 69 is threaded and provided with a threaded plug 71.

A cable or rope 72 is wound around the spool 8 and has one end attached to the spool by bolt or pin 73 and its other end is secured to a shovel (not shown) for movement of the grain or other material.

Operation of the device assembled and constructed as described is as follows:

Assuming that the motor or operating power is at the right side for operation of the shaft 3 and ready for operation by the operator of the shovel, the chain 31 is completely wound on the sleeve 30 at which time the lever 17 has disengaged the clutch portions 11 and 13 and the lever 17 is locked in a position as shown in FIGS. 1 and 3 by finger 23. The cable 72 is also wound on the spool or drum 8. The operator of the shovel starts back in the car with the shovel pulling the cable 72 off of the drum 8, thus rotating the drum clockwise, and the shaft 3 is continuously rotating counter-clockwise driven by the motor (not shown). The straight edges 49 of the plungers 45 and 46 will be engaged with the shaft 3 and slide around the shaft in an opposite direction to the rotation of said shaft. At the time the cable is being unwound the chain 31 is also being unwound off the sleeve 30. When the operator moves into the car to the desired spot whre he wishes to start moving the grain or other bulk material out the car door, he gives the cable 72 a quick light pull to cause a foot or so of slack cable to unwind from the drum 8 leaving the drum free to rotate counter-clockwise or with shaft 3 through the braking action or contact of the plungers 45 and 46 on the shaft 3. As the drum 8 and sleeve 30 start their rotating action thus rotating the flange 35 on the sleeve the lugs 50 thereon will strike the tongue 29 on the arm 22 to raise the finger or shoulder 23 from the end of the lever 17. The spring 26 will then pull the arm portion 74 of the lever 17 outwardly which in turn will move the clutch portion 13 into engagement with the clutch portion 11 thus causing the drum 8 to continue to rotate with the shaft 3 and rewind the chain 31 on the sleeve as well as the cable 72 on the drum 8 drawing the shovel with the bulk material to the door of the car. When the chain is wound on the sleeve 30 it will draw the lever 17 into engagement with the arm 22 and disengage clutch members 11 and 13 thus completing the cycle of one operation of the shovel so that the operator may then move back into the car for another load. While the end of the arm 22 with its finger 23 normally moves back into locking position with the lever 17, if desired a weight (not shown) may be added to that end of the arm to assist in the pivoted action thereof.

It will be noted in FIG. 2 the plugs 45 and 46 may be provided with recesses or sockets to receive one end of the coil springs 47 and 48 and the plugs may be screwed in to give the desired pressure to cause the spool 8 to rotate with the shaft. The inner ends of the plugs 45 and 46 may be made of bronze or other suitable material and act as a brake against the shaft 3 and by acting as a brake will cause the drum or spool 8 to revolve the same as the weight or rope or cable and thus a fine adjustment can be effected of the plugs with respect to the shaft 3. The shaft rotates continuously in one direction while the entire drum assembly rotates in the opposite direction when the operator in the car pulls the cable trained over the drum as the shovel is moved back into the car. When the operator gives a quick jerk on the line the slack provided allows the spool or drum 8 to revolve in the direction the shaft 3 is turning to trip the mechanism and engage the clutch members 13 and 11.

By providing the lubricant for the plugs 45 and 46 and the sealing members as described, the efficiency of operation of the apparatus is greatly improved and the wear on the moving parts is eliminated. The lubrication of the device at frequent intervals is also eliminated as new lubrication may not be necessary for several months even in operating in dusty conditions.

It will be obvious from the foregoing that I have provided an improved apparatus for unloading of grain or bulk material from cars and particularly the lubrication system for such apparatus wherein wear on the moving parts is eliminated.

What I claim and desire to secure by Letters Patent is:

In an operator for a power shovel, a rotatably supported shaft adapted to be connected to a power source, a hollow drum containing liquid lubricant and having axially extending sleeve portions on each side thereof with bearing portions therein rotatably mounting said drum on said shaft, said sleeve portions having ends beyond said bearing portions, seal means adjacent the ends of said sleeve portions and engaging said shaft to retain said liquid lubricant in the drum and bearing portions, said drum being adapted to have a shovel cable trained thereover, clutching elements interposed between the drum and the shaft, one of the sleeve portions being elongate and having spaced annular flanges extending therefrom and defining a spool therebetween, said one sleeve having a bore larger than said shaft extending from the hollow drum to the bearing portion therein for movement of lubricant thereto from the hollow drum, diametrically opposed bores extending through said one sleeve adjacent said drum and into said bore, plug means adjustable in and closing outer end of said opposed bores, plungers slidably mounted in said opposed bores, and spring means interposed between said plungers and the respective plug means to urged said plungers into engagement with said shaft, said plungers having flat inner end surfaces in planes normal to plunger axes whereby said inner end surfaces frictionally engage said shaft with a line contact and are lubricated by liquid lubricant from the hollow drum, said plug means being adjustable to adjust pressure of said plungers on said shaft.

References Cited in the file of this patent

UNITED STATES PATENTS

| | | |
|---|---|---|
| 2,264,970 | Giles | Dec. 2, 1941 |
| 2,574,062 | Reynolds | Nov. 6, 1951 |
| 2,646,965 | Addicks | July 28, 1953 |
| 2,705,126 | Addicks | Mar. 29, 1955 |
| 2,760,802 | Haley | Aug. 28, 1956 |
| 2,854,267 | Stephens | Sept. 30, 1958 |
| 2,857,028 | Brooks | Oct. 21, 1958 |